(12) United States Patent
Giuffrè

(10) Patent No.: US 12,048,274 B2
(45) Date of Patent: Jul. 30, 2024

(54) SPRINKLER PIPE

(71) Applicant: Irritec S.p.A., Capo d'Orlando (IT)

(72) Inventor: Carmelo Giuffrè, Capo d'Orlando (IT)

(*) Notice: Subject to any disclaimer, the term of this patent is extended or adjusted under 35 U.S.C. 154(b) by 280 days.

(21) Appl. No.: 17/293,517

(22) PCT Filed: Oct. 25, 2019

(86) PCT No.: PCT/IB2019/059168
§ 371 (c)(1),
(2) Date: May 13, 2021

(87) PCT Pub. No.: WO2020/084584
PCT Pub. Date: Apr. 30, 2020

(65) Prior Publication Data
US 2022/0117172 A1    Apr. 21, 2022

(30) Foreign Application Priority Data

Oct. 26, 2018 (IT) .......................... 102018000009811
Oct. 26, 2018 (IT) .......................... 102018000009815

(51) Int. Cl.
*A01G 25/02*    (2006.01)
*B05B 1/20*    (2006.01)

(52) U.S. Cl.
CPC ................ *A01G 25/02* (2013.01); *B05B 1/20* (2013.01)

(58) Field of Classification Search
CPC ........... B05B 1/20; B05B 1/202; B05B 1/205; A01G 25/023; A01G 25/026; A01G 2025/006; A01G 25/02–06
USPC ......................................................... 239/542
See application file for complete search history.

(56) References Cited

U.S. PATENT DOCUMENTS

| | | | | |
|---|---|---|---|---|
| 8,002,496 | B2 * | 8/2011 | Giuffrè | ................ A01G 25/023 239/542 |
| 8,302,887 | B2 * | 11/2012 | Park | ..................... A01G 25/023 239/548 |
| 2003/0057301 | A1 | 3/2003 | Cohen | |
| 2005/0258278 | A1 | 11/2005 | Cohen | |

FOREIGN PATENT DOCUMENTS

EP      1959724      1/2016

* cited by examiner

*Primary Examiner* — Joseph A Greenlund
*Assistant Examiner* — Juan C Barrera
(74) *Attorney, Agent, or Firm* — Themis Law

(57) ABSTRACT

A sprinkler pipe includes an elongated pipe element having at least one longitudinal row of dispensing holes distributed at predefined distances, each of the holes communicating with a drip unit provided inside the pipe and having at least one inlet communicating with the inside of the pipe and at least one outlet communicating with at least one dispensing hole.

12 Claims, 12 Drawing Sheets

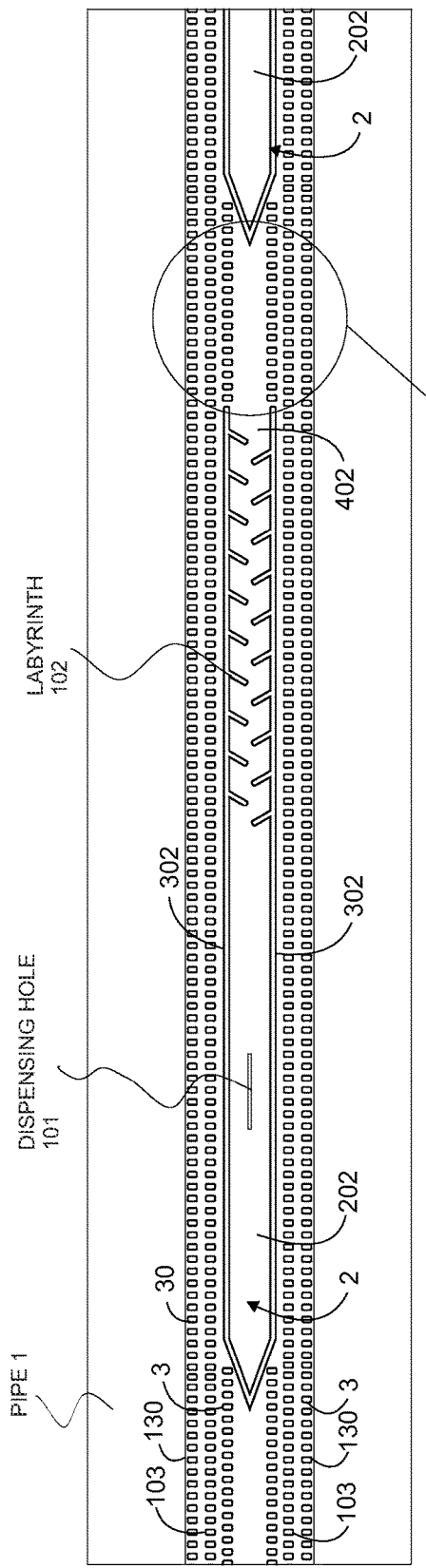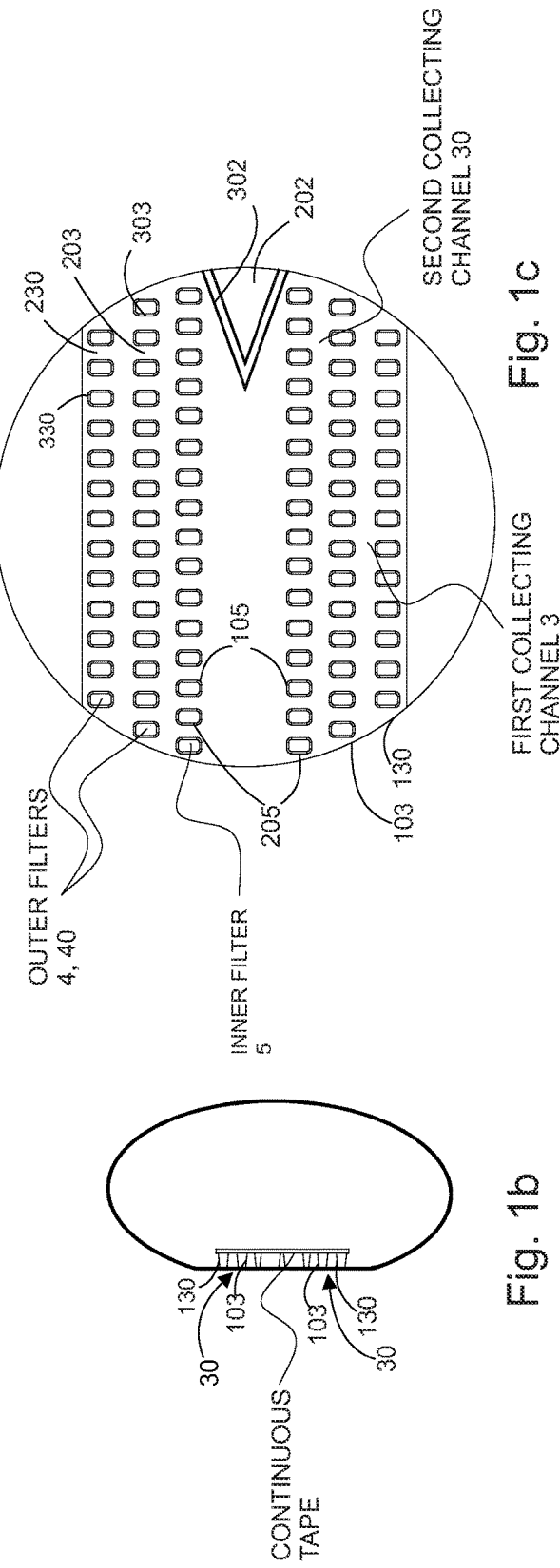

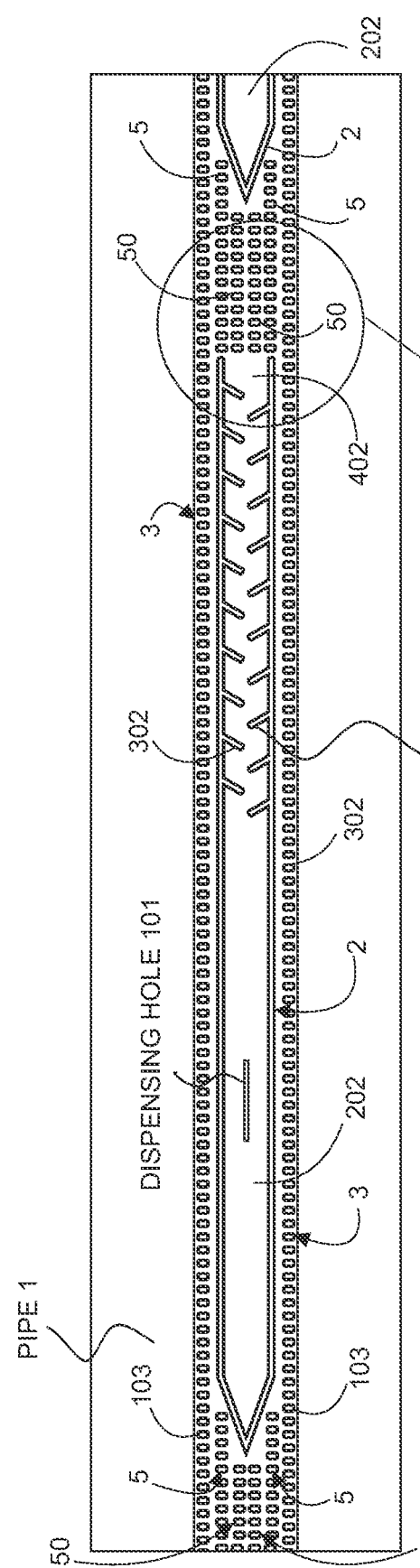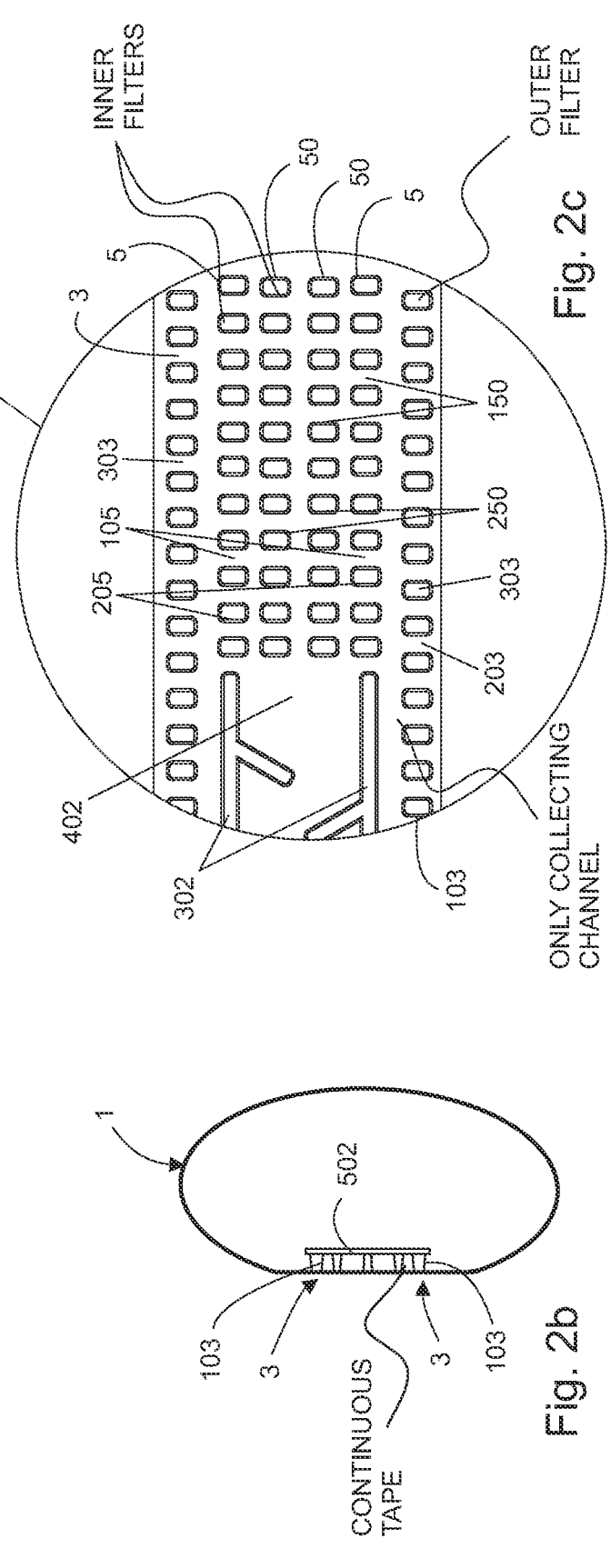

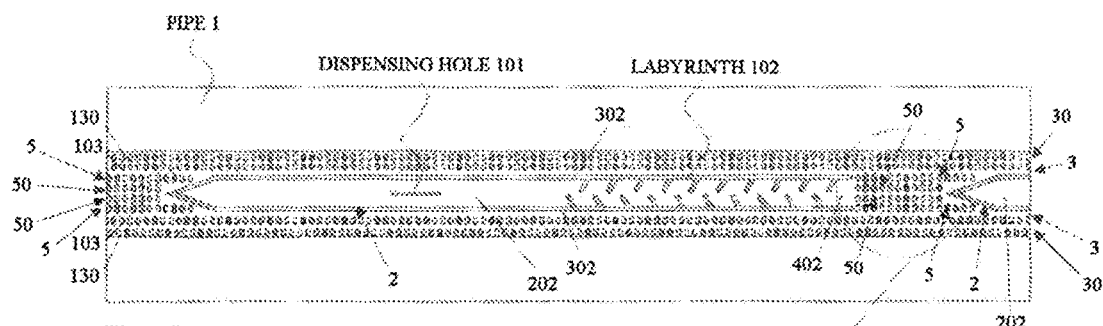
Fig. 3a
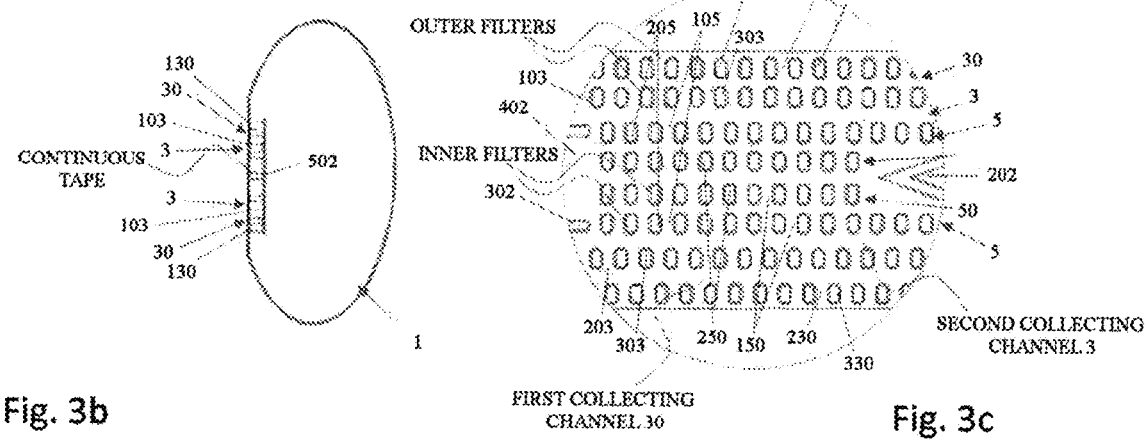
Fig. 3b
Fig. 3c

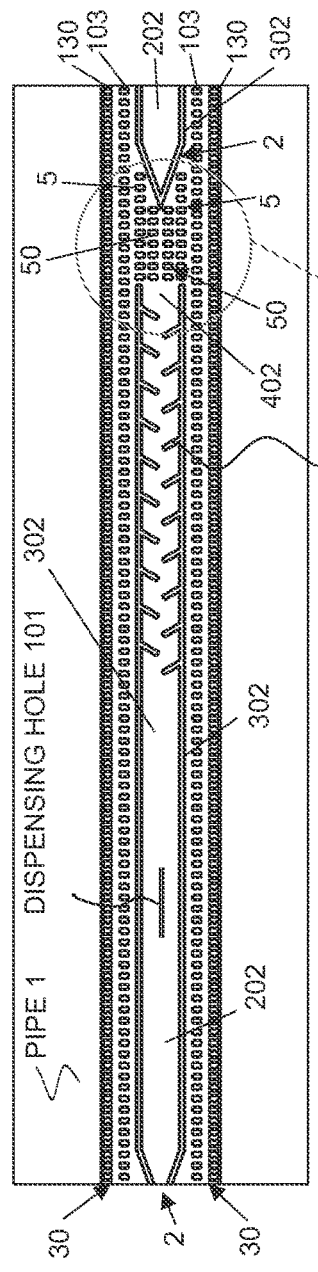
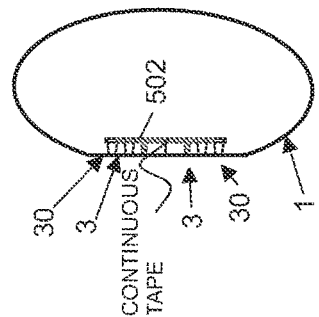
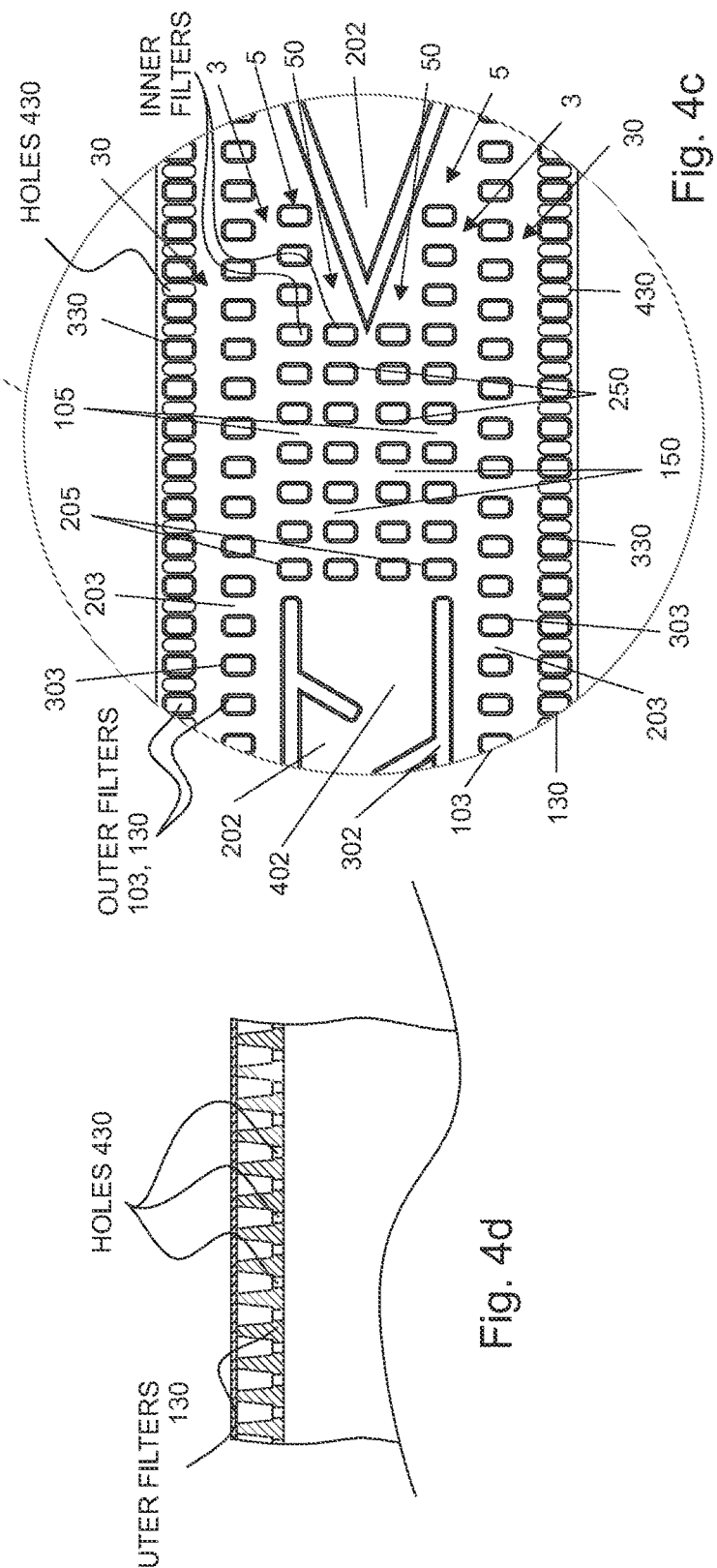

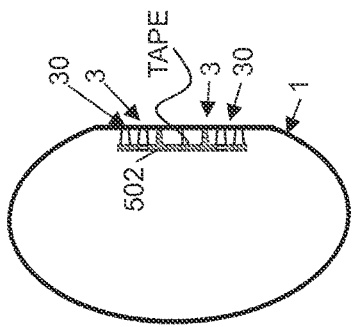
Fig. 5b
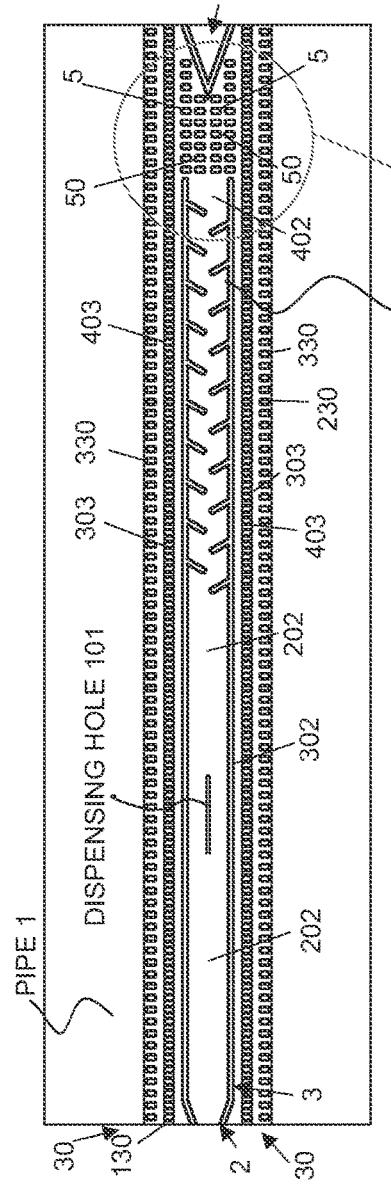
Fig. 5a
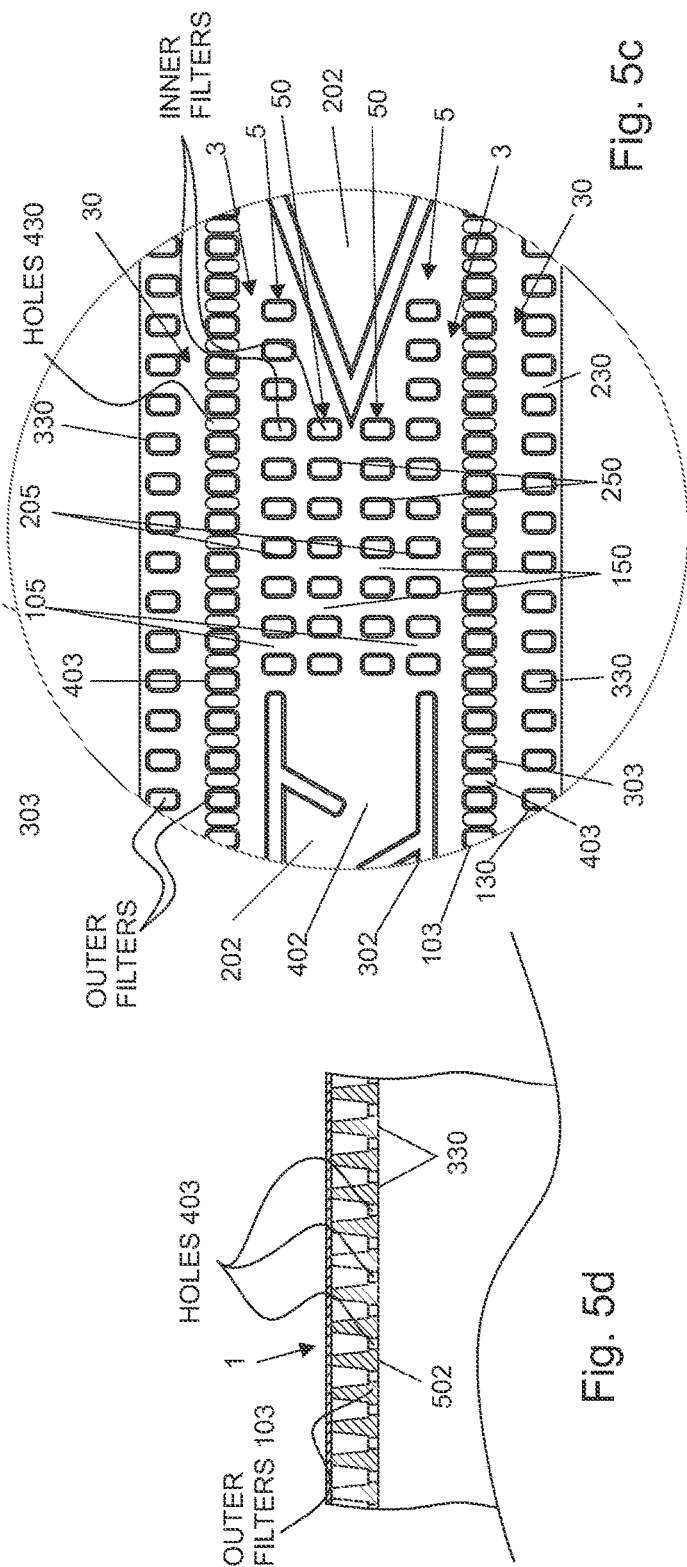
Fig. 5c
Fig. 5d

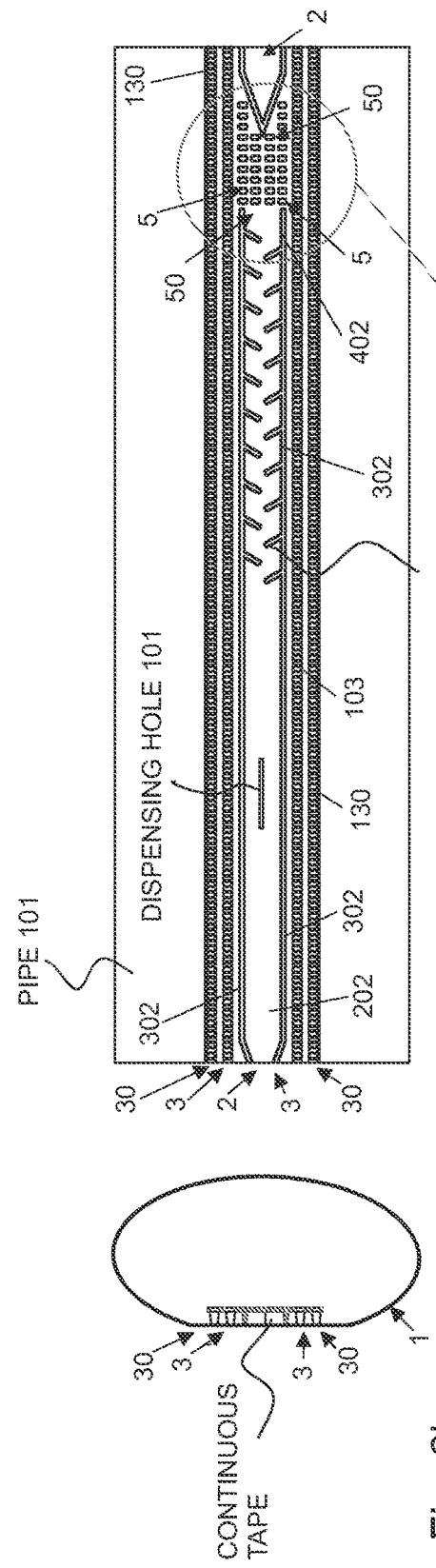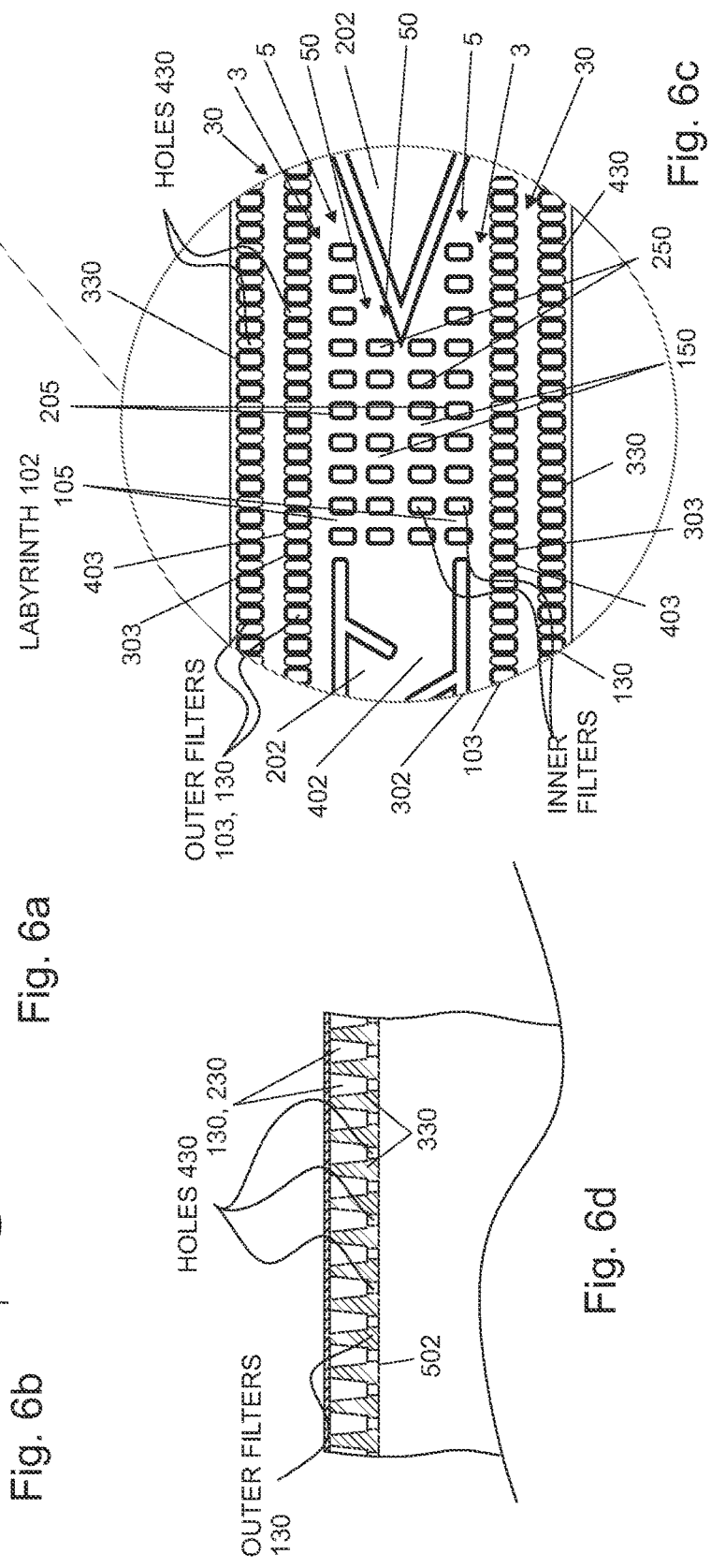

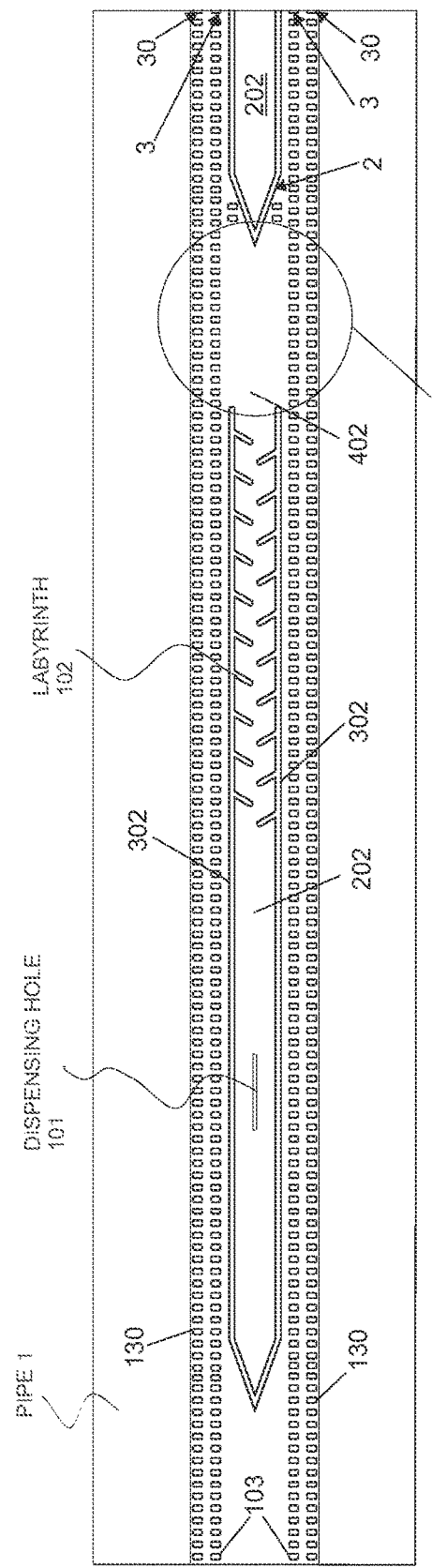
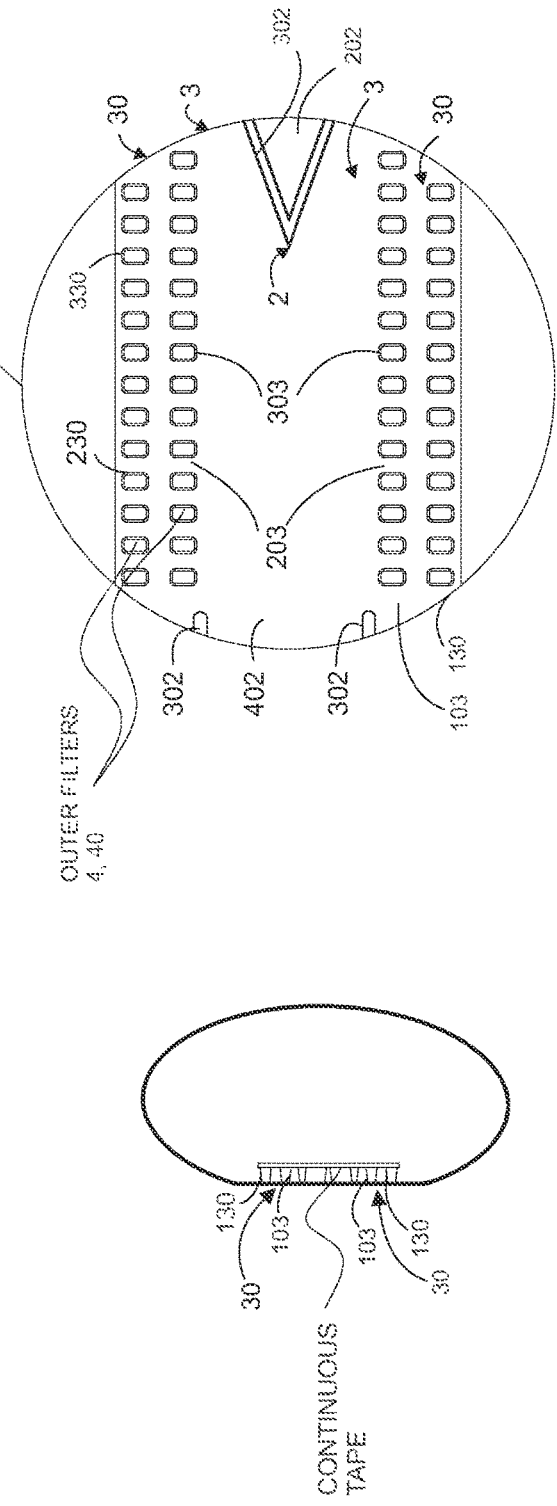

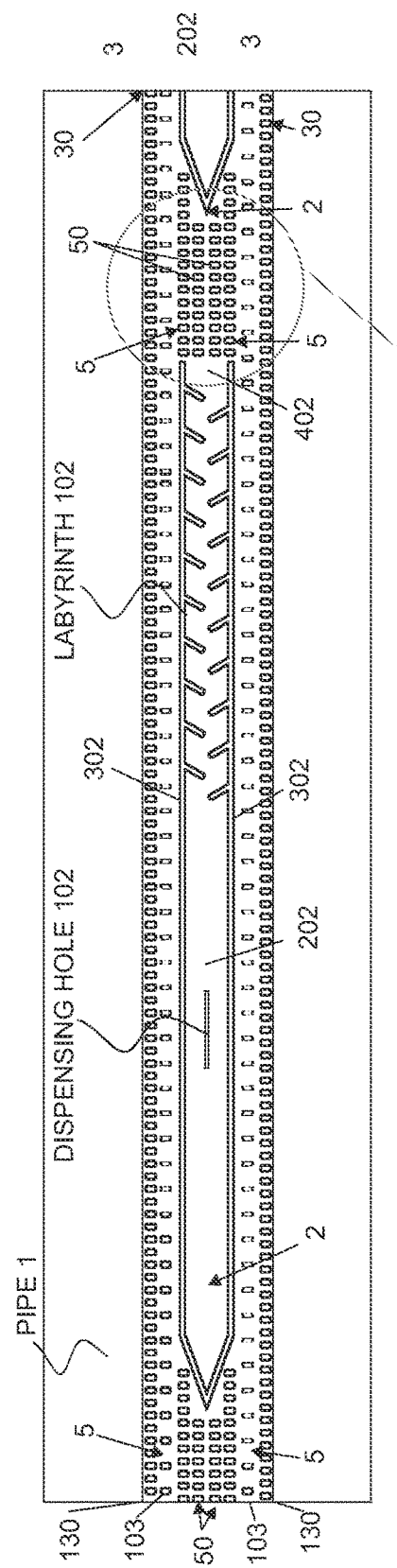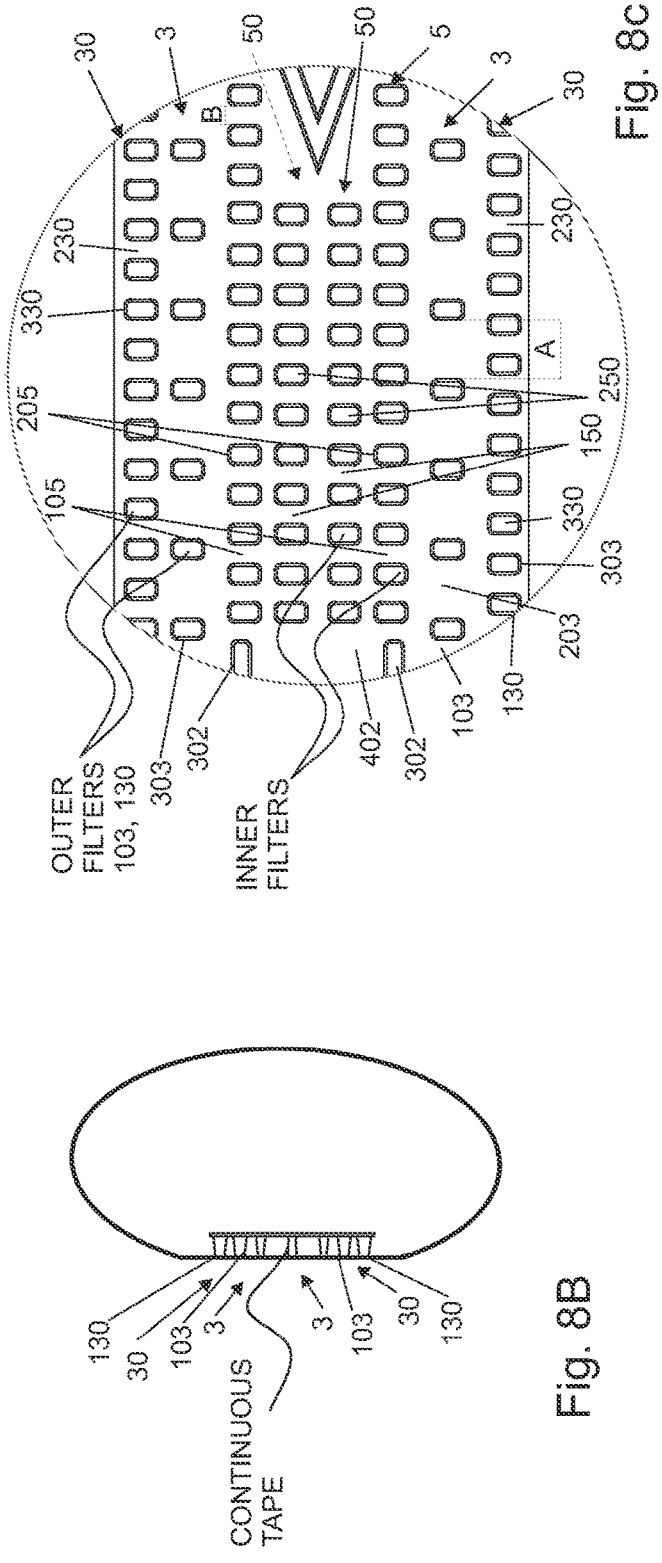

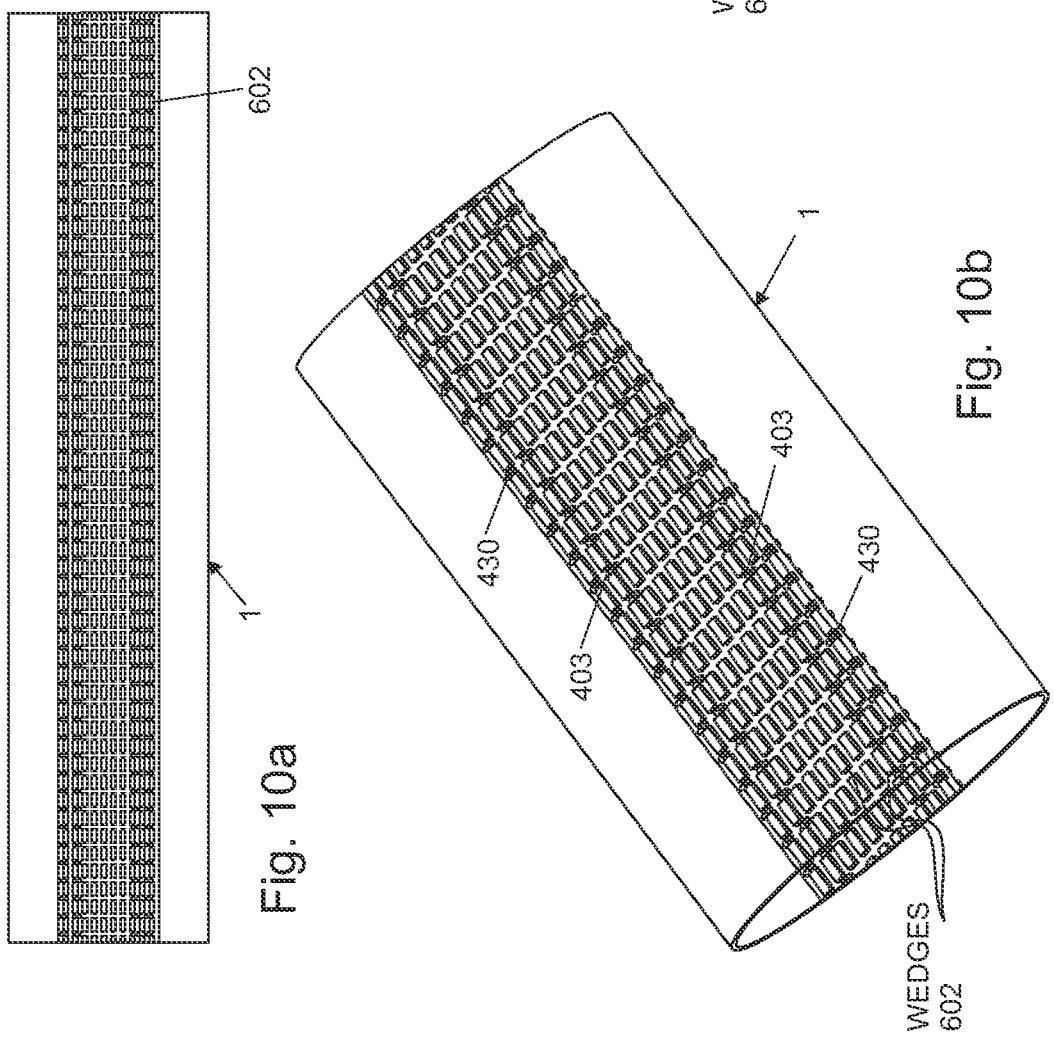

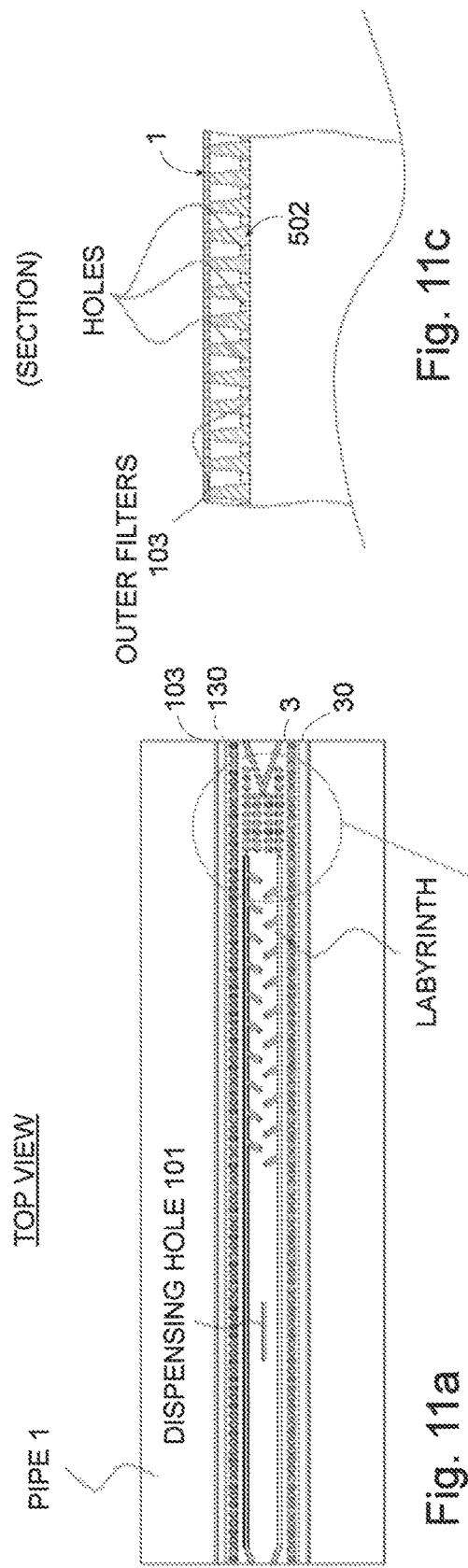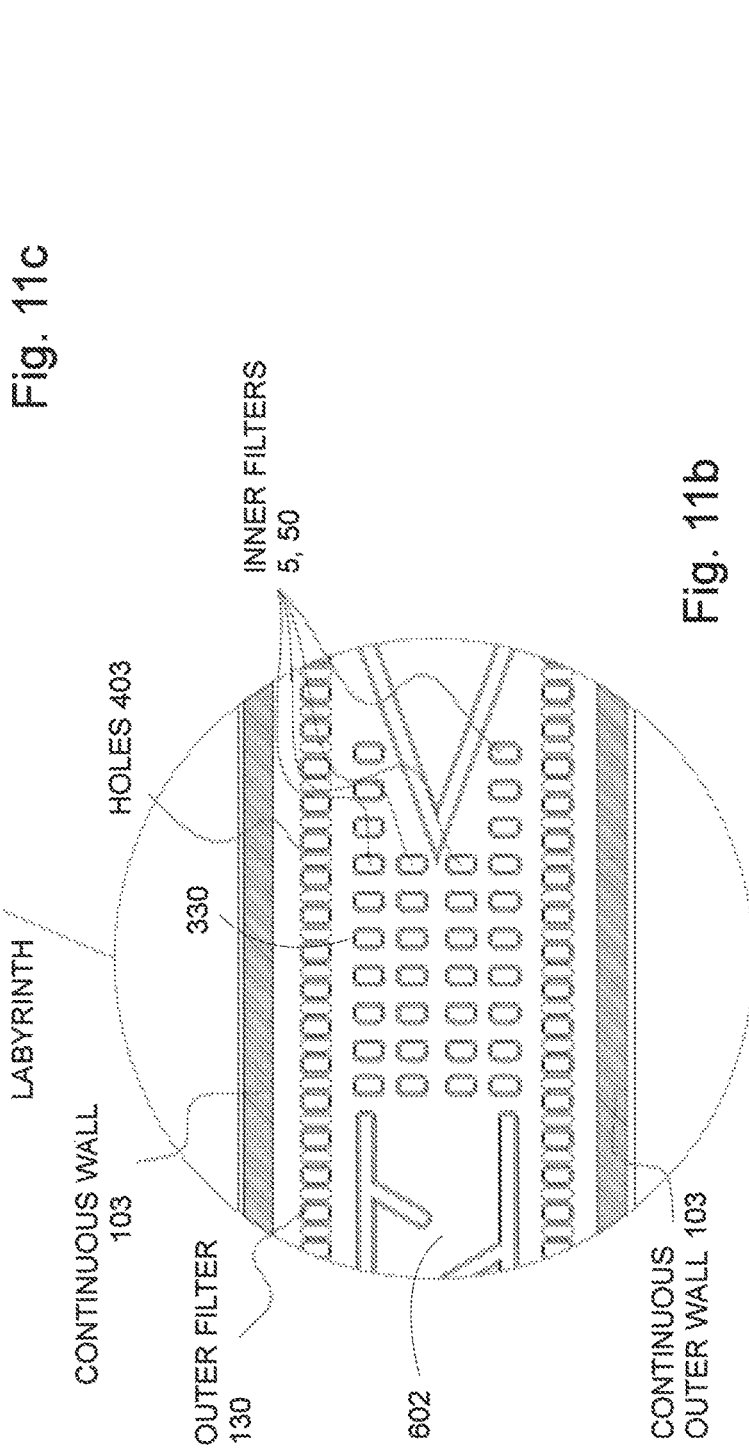

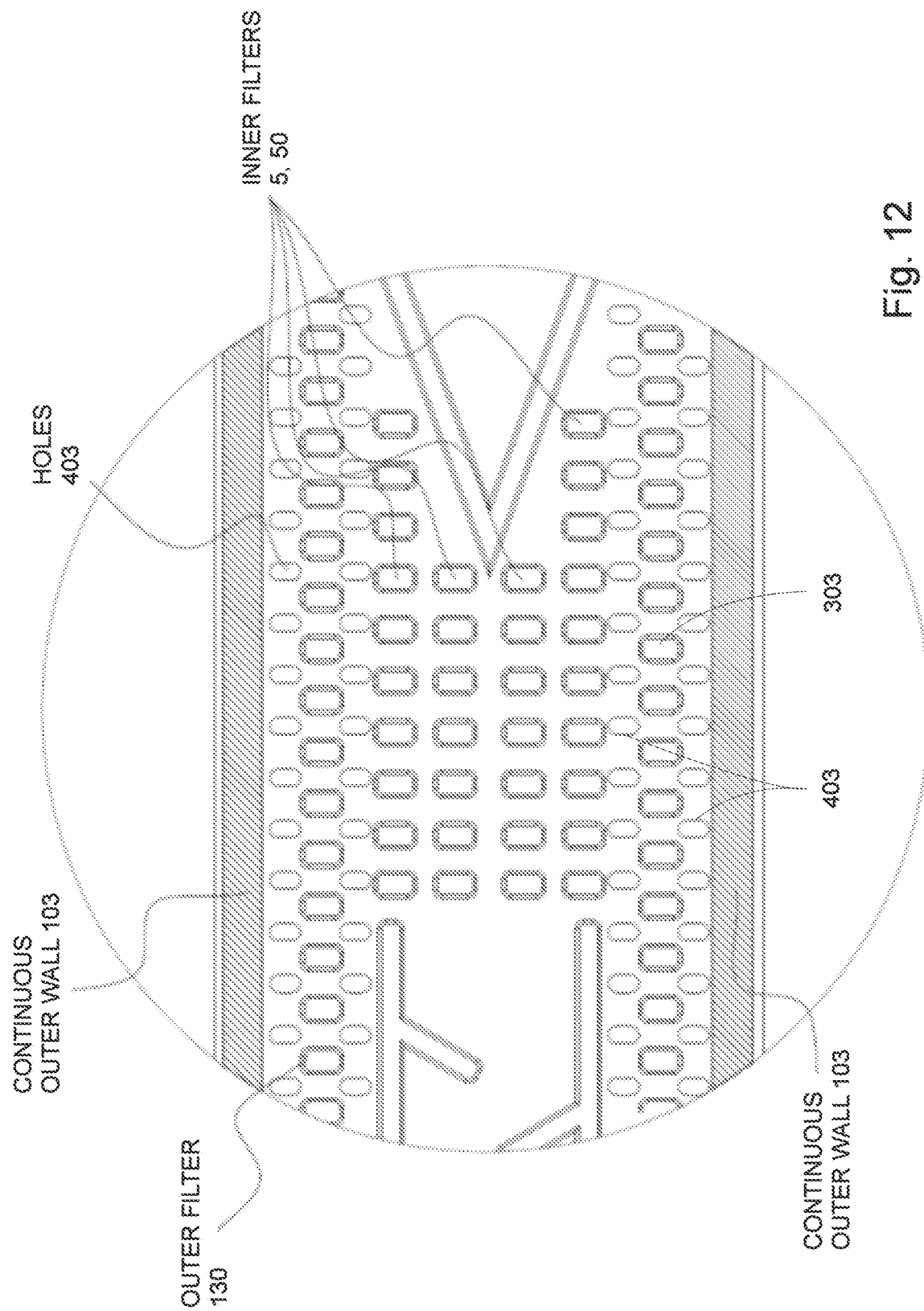

SPRINKLER PIPE

The invention refers to a sprinkler pipe comprising an elongated pipe element having at least one longitudinal row of dispensing holes distributed at predefined distances and which holes each communicate with a drip unit provided inside the pipe and having at least one inlet communicating with the inside of the pipe and at least one outlet communicating with at least one dispensing hole and wherein the inlets of all or of a certain number of drip units respectively communicate with the inner compartment of the pipe by means of at least one first collecting channel or of a succession of segments of said first collecting channel in the axial direction of the pipe, provided along at least one or both sides of the longitudinal row of drip units and which extend along the entire extent or along part of said extent of said longitudinal row of drip units, while the collecting channel or channels are delimited, on the sides facing the inside of the pipe, by a bottom wall consisting of a wall parallel to the wall of the pipe, along the band defined by the row of drip units, and by a longitudinal side filter-like wall provided with openings of predefined size and alternated with closed wall lengths or wall segments.

In particular, the invention refers to a pipe wherein the drip units are formed by a continuous tape intended to adhere against a coinciding longitudinal band of the inner wall of the pipe, along which band the row of dispensing holes extends and which tape forms the wall of said drip units that is facing the inside of the pipe and parallel to the wall of the pipe along the band adhering thereto, while it has, on the side adhering to the inner wall of the pipe, longitudinal ribs outwardly protruding from said side of the tape and which act as bridges for spacing the tape from the corresponding inner side of the pipe and which are shaped according to a pattern such as, in an adhering condition of the ends or free sides of these ribs against the inner side of the pipe, they form, between said inner side and the tape wall parallel thereto, the side walls delimiting the passages and/or the chambers of the elements of a repetitive succession of identical drip units which are spaced from one another such that each drip unit has an outlet collector coincident with at least one dispensing hole of the pipe and an inlet of said outlet collector with the inside of the pipe and a labyrinth or pressure reducer interposed between said inlet and said collector and possibly a filter between said inlet and said labyrinth or said pressure reducer.

Each collecting channel is delimited, on the longitudinal side facing the drippers, by a wall longitudinally delimiting a labyrinth or pressure reducer and the outlet collector, whereas said delimiting wall stops at the inlet end of said labyrinth or pressure reducer for a certain length, thus generating a passage between the collecting channel and said inlet into said labyrinth or pressure reducer, said opening being of a certain length in the axial direction of the pipe and being delimited, on the end opposite the inlet of the labyrinth, by the wall of the outlet collector and of the labyrinth or pressure reducer of the adjacent drip unit.

A sprinkler pipe of this type is known by the document EP1959724 (B1), which is included in the present description for reference.

As far as the operation of these pipes is concerned, there are conflicting conditions and needs. On one hand, it is desired to allow a distribution of the liquid dispensed along the entire length of the pipe in an essentially uniform way for each dispensing hole, also in very different liquid supply pressure conditions. On the other, there is also the need to carry out an effective filtering that avoids passages and chambers that are too small and which can easily be blocked up, also by very small particles of impurities present in the liquid, thus protecting from the accumulation of these impurities in the labyrinth or pressure reducer. And still, it is desired to have a good fluid flow rate, thus maintaining a certain passage flow rate of the possible filters.

To this purpose, the inlet filter consisting of at least the outer side wall of one or both of the collecting channels on both sides of the row of drip units must be sufficiently selective on one hand, in order to avoid the entry of relatively small particles of impurities, while avoiding a reduction of the flow rate of each drip unit on the other, without requiring external supports for controlling the pressure of the fluid inside the pipe and, especially at low fluid pressures and in particular for long lengths of the sprinkler pipe, thus maintaining the uniformity of the flow rate of the fluid dispensing from the dispensing holes distributed along the length of the pipe.

The filtering action must also be such as to effectively withhold the particles of impurities within a defined field of granulometries without causing filter clogging conditions, but by allowing said particles to be intercepted before entering the drippers and to stay exposed to a flow component in the axial direction of the pipe that allows to remove at least a certain part of them thanks to the flow of fluid inside the pipe.

More generally, the invention thus intends to achieve a pipe of the type described in the beginning, wherein the succession of drip units is made such as to ensure better uniformity of the fluid flow dispensed by the holes of the succession of dispensing holes and this also for long lengths of the sprinkler pipe and/or for low dispensing pressures.

Moreover, the invention intends to ensure an optimal filtering action on the fluid entering the drippers, thus avoiding flow rate reductions and risks of blocking up the drippers and/or also the filters themselves, such as to ensure that the dispensing of the fluid from the dispensing hole or holes supplied by the drip units is not completely absent.

Thus, object of the invention is to achieve greater dispensing uniformity and a greater guarantee of the dispensing pipe's operating duration and safety, all this without however involving higher manufacturing or maintenance costs.

For this specific aspect, the invention particularly intends to improve a sprinkler pipe of the type described in the beginning by providing a new pattern for the ribs and projections protruding from the tape forming one of the constructive walls of the succession of drip units, thanks to which a new type of filtering element for filtering the liquid on the inlet side of the drip units is achieved.

The invention achieves the objectives mentioned above with a pipe of the type described in the beginning, wherein, at all or at least some of the openings of the longitudinal side wall facing the inside of the pipe of said one or more collecting channels, a communication hole of said channel is provided in the bottom wall thereof, i.e. in the band of the wall delimiting the row of drip units towards the inside of the pipe and which is parallel to the coinciding wall band of the pipe along which said row of drip units extends.

According to an embodiment, on at least one side, preferably on both longitudinal sides of the row of drip units, one or more further collecting channels or successions of segments of said collecting channels, which extend along said first collecting channel or said succession of segments of collecting channels on the side thereof facing the inside of the pipe, are provided, each of said one or more further collecting channels having a side wall, longitudinal on its side facing the inside of the pipe, at least one hole, preferably a plurality of dispensing holes on the longitudinal extent of said bottom wall being provided in the bottom wall of one or some or all collecting channels.

In an embodiment, which has, on one or both sides, two or more adjacent collecting channels separated from one another by a shared longitudinal side wall, said wall is made filter-like and provided with openings of predefined size which are alternated with closed wall lengths or wall segments for at least part of the length of said wall.

It is possible to provide different alternative embodiments as far as the openings in the longitudinal side walls of the collecting channels are concerned, on their side facing the inside of the pipe, and which can be selected between one or a combination of the following combinations, comprising openings in the side walls of all or part of the collecting channels having identical or different passage port, openings in the side walls of all or part of the collecting channels having positions aligned between one another or coinciding in the axial direction of the pipe, openings in the side walls of all or part of the collecting channels having a position between one another not coinciding with reference to the axial direction, a different or equal number of openings in the side walls for at least part of the collecting channels, openings in the longitudinal side walls of part or all collecting channels having an uneven distribution along the longitudinal extent of said wall and having zones of greater density and zones of lesser density depending on the relative position with respect to the inlet of the drip unit, openings in the side walls of all or part of the collecting channels having a different size of port depending on their position with reference to the inlets of the drip units.

In the present introduction, in the detailed description and in the claims, the term axial always refers to the longitudinal axis of the pipe and the term longitudinal, with reference to the tape and ribs that form the operating units of the drippers as well as the row of drippers, is to be interpreted as synonymous of axial unless otherwise specified or shown in a different direction.

Moreover, in the present introduction, in the detailed description of the examples and in the claims, also unless otherwise expressly specified, the term collecting channel includes both a continuous collecting channel and an axial succession of segments of collecting channels for simplicity.

If more collecting channels are arranged side by side, as object of the present invention defined above, at least part or all of the collecting channels provided can be continuous or constituted by said succession of segments of collecting channels.

A further embodiment provides that, at all or at least some of the openings of the longitudinal side wall facing the inside of the pipe of one or more collecting channels, a communication hole of said channel is provided in the bottom wall thereof, i.e. in the band of the wall delimiting the row of drip units towards the inside of the pipe and which is parallel to the coinciding wall band of the pipe along which said row of drip units extends.

In the preferred embodiment, which provides that the drip units and collecting channels are formed by a flat continuous tape provided with a group of protruding ribs made according to a pattern such that the combination of said ribs with the flat tape wall and with the pipe wall, against which said tape is applied by adhering the free ends of said ribs to said inner wall of the pipe, said bottom wall consists of the flat wall of said tape parallel to the band adhering to the inner wall of the pipe and spaced therefrom thanks to the group of ribs present on the tape itself.

Also said holes in the bottom wall, i.e. in the flat wall of the tape, can be configured according to different variants that can be selected between one or more of the following alternatives or combinations thereof, consisting in holes in the bottom wall of part or all the collecting channels, openings in the bottom wall of all or more collecting channels having different or identical passage ports, holes in the bottom wall of all or part of the collecting channels, only provided in some zones of said collecting channels or with an uneven distribution along the extent of the collecting channels, holes for all or part of the collecting channels distributions along the same so that to achieve a greater density in the zone of the inlets of the drip units, a distribution of holes in all collecting channels or in part thereof according to which said holes in the bottom wall are provided at all or only with some of the openings of the side walls of the collecting channels facing the inside of the pipe.

From the above, it is clear that while the first most inner collecting channel, provided with the row of drip units respectively on only one longitudinal side or on both longitudinal sides, is delimited on the longitudinal side facing the drip units by a wall longitudinally delimiting a labyrinth or pressure reducer and the outlet collector, each of the one or more further collecting channels provided adjacent to said first collecting channel are delimited, on the side facing the drip units, by the longitudinal side wall of the respectively most inner collecting channel with respect to the drip units, which is provided with said filtering openings.

In an embodiment, the collecting channels directly adjacent to the drip units are provided with openings for the passage of fluid communicating with the inlet of at least one respective drip unit. Said passage can be clear or also provided with at least one filter combined with each collecting channel and constituted by at least one filtering wall.

In an embodiment, said wall delimiting the collection channel or channels directly adjacent to the drip units, on the side thereof facing said drip units, stops at the inlet end of said labyrinth or pressure reducer of each drip unit, thus generating a passage between the collecting channel and said inlet into said labyrinth or pressure reducer, said passage opening being of a certain length in the axial direction of the pipe and being delimited, on the end opposite the inlet of the labyrinth, by the wall of the outlet collector and of the labyrinth or pressure reducer of the adjacent drip unit.

Still according to an embodiment provided in any combination with the preceding ones, at the aforesaid opening in the longitudinal side wall delimiting the or each of the first collecting channels, i.e. the collecting channel or channels immediately adjacent to the drip units for the passage of the fluid from said collecting channel or channels, at least one further filter is provided, which filter is constituted by a longitudinal filtering wall extending along the length of said opening and preferably in parallel to the longitudinal side wall facing the inside of the pipe of each first collecting channel, which filtering wall is provided with a row of openings.

A first embodiment provides that said filtering wall is provided longitudinally aligned with the longitudinal side walls of the outlet collector and of the labyrinth or pressure reducer of respectively two adjacent drip units.

A further embodiment provides alternatively or in combination:

two or more further filtering walls each provided with a row of openings arranged in parallel to one another and at a predefined side distance;

one or more holes in the bottom wall constituted by the wall parallel to the pipe wall along which the row of drip units extends, said holes being provided at the openings in said filtering walls and/or in the bottom wall bands interposed between the different filtering walls.

Also in this case, it is possible to provide different variants that are constituted by one or more of the following configurations provided alternatively to or in combination with one another and which consist in:

openings in all or part of the filtering walls and/or holes of identical or different size in the bottom wall, openings in all or in part of the filtering walls and/or holes in the bottom wall and which are provided coincident to one another in a transverse direction of the pipe or of the row of drip units, openings in all or in part of the filtering walls and/or holes in the bottom wall, which are distributed unevenly or which are of non-identical size from one another depending on the distance from the inlet to the corresponding drip unit, a number of openings in at least part of the filtering walls and/or holes in the bottom wall, which is different for each filtering wall of said at least part of filtering walls.

Still according to a further characteristic, which can be provided in combination with one or more of the embodiment variants previously described, on the wall delimiting the row of drip units towards the inside of the pipe and in parallel to the band of the pipe wall along which said row of drip units extends, i.e. said bottom wall or wall of the tape opposite the inner wall of the pipe to which the row of drip units is applied, one or more rows of projections spaced from one another are provided.

Such projections can be distributed according to any pattern.

An embodiment variant provides that they are arranged on several longitudinal rows parallel to one another and/or on several transverse rows parallel to one another, thus forming a sort of grid of channels interposed between the individual projections.

It is possible to provide different variants which can be selected in alternative or in combination between the following:

projections having the same or different size in height and/or in plan view, projections having the same shape in plan view and/or in the cross section and/or in the axial section, projections having an even distribution, i.e. equal distances from one another or different from one another along an axial and/or transverse direction with respect to the axial one.

When holes in the bottom wall, at the collecting channels and/or at the openings of the longitudinal side walls of these channels, and/or holes in the bottom wall of the filtering walls and/or of the intermediate zones in-between them are provided, the projections are distributed such as to be arranged in a position not coinciding with said holes, thus forming a filtering grid or knurl operating in combination with said holes in the bottom wall.

Further improvements of the invention are object of the sub-claims and, in particular, a tape for manufacturing the sprinkler pipe, which tape has a series of ribs applied thereto according to a predefined pattern so that said ribs form spacing elements for spacing said tape from the inner wall of the pipe and sealingly fastening elements for sealingly fastening the tape to the inner wall of the pipe, simultaneously generating the collecting channels, possible filtering walls and elements of the drip units.

The characteristics of the invention and the advantages deriving therefrom will become clearer in the following description of some non-limiting exemplary embodiments shown in the accompanying drawings, in which:

FIGS. 1a, 1b and 1c respectively show a plan view on a tape segment forming the row of drip units, a cross section of the pipe to which said tape is applied to form the row of drip units and an enlarged particular of the plan view of a first embodiment of the invention.

FIGS. 2a, 2b and 2c respectively show a plan view on a tape segment forming the row of drip units, a cross section of the pipe to which said tape is applied to form the row of drip units and an enlarged particular of the plan view of a sprinkler pipe segment according to a second embodiment of the invention.

FIGS. 3a, 3b and 3c respectively show a plan view on a tape segment forming the row of drip units, a cross section of the pipe to which said tape is applied to form the row of drip units and an enlarged particular of the plan view of a sprinkler pipe segment according to a third embodiment of the invention.

FIGS. 4a, 4b, 4c and 4d respectively show a plan view on a tape segment forming the row of drip units, a cross section of the pipe to which said tape is applied to form the row of drip units and an enlarged particular of the plan view of a sprinkler pipe segment and an enlarged particular of the sectional axial view according to a fourth embodiment of the invention.

FIGS. 5a, 5b, 5c and 5d respectively show a plan view on a tape segment forming the row of drip units, a cross section of the pipe to which said tape is applied to form the row of drip units and an enlarged particular of the plan view of a sprinkler pipe segment and an enlarged particular of the sectional axial view according to a fifth embodiment of the invention.

FIGS. 6a, 6b, 6c and 6d respectively show a plan view on a tape segment forming the row of drip units, a cross section of the pipe to which said tape is applied to form the row of drip units and an enlarged particular of the plan view of a sprinkler pipe segment and an enlarged particular of the sectional axial view according to a sixth embodiment of the invention.

FIGS. 7a, 7b and 7c respectively show a plan view on a tape segment forming the row of drip units, a cross section of the pipe to which said tape is applied to form the row of drip units and an enlarged particular of the plan view of a sprinkler pipe segment according to a seventh embodiment of the invention.

FIGS. 8a, 8b and 8c respectively show a plan view on a tape segment forming the row of drip units, a cross section of the pipe to which said tape is applied to form the row of drip units and an enlarged particular of the plan view of a sprinkler pipe segment according to an eighth embodiment of the invention.

FIGS. 9a to 9c respectively show a plan view on the side of the tape forming the row of drip units, facing the wall adhering to the pipe, a perspective view on said pipe segment and with the pipe in transparency, a pipe cross section and an enlargement of the plan view according to a ninth embodiment of the invention.

FIGS. 10a, 10b and 10c respectively show a plan view on the bottom side of the tape, i.e. on the side of the tape forming the row of drip units and facing the inside of the pipe and parallel to the band of the pipe along which the row of drip units is distributed, a perspective view on said pipe segment and with the pipe in transparency, an axial section of the pipe in the zone of the drip units according to a tenth embodiment of the invention.

FIGS. 11a, 11b and 11c show, similarly to the preceding figures, the views of a tenth embodiment of the invention.

FIG. 12 shows, similarly to FIG. 11c, an embodiment variant of the tenth embodiment.

Figure 9A:
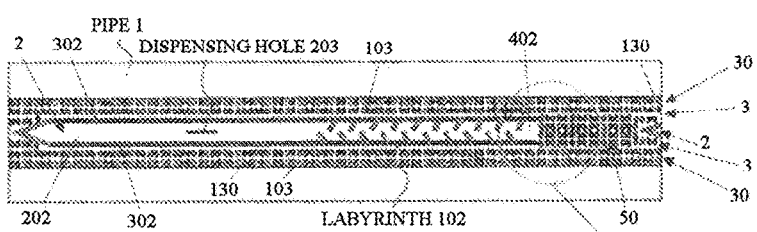

With reference to the description and claims, the term longitudinal row means a row of elements arranged one after the other along a straight line or a line oriented in the longitudinal direction of the pipe, i.e. preferably, but not necessarily, in parallel to the axis of said pipe. In fact, although it is undoubtedly quicker and simpler to achieve the row of drip units oriented according to an axis parallel to the axis of the pipe from a constructive point of view, the possibility that said row of drip units can also extend along an axis oriented along a non-straight line, for example a wavy line or a helical line, is not to be excluded.

With reference to FIGS. 1a, 1b, 1c, a first embodiment of a sprinkler pipe segment of the so-named drip type is shown therein. A pipe 1 with a perimeter wall completely closed on itself, without interruptions, has a succession of drip units 2 therein and along a longitudinal band of said pipe wall. The drip units consist of a pressure-reducing or labyrinth element 102 and of an outlet collector element 202. The outlet collector element forms a chamber communicating and/or coinciding with a drip opening 101, i.e. a dispensing hole, provided in the pipe wall 1. The pipe wall 1 has a plurality of said drip openings 101 which are aligned with one another according to a straight longitudinal line coinciding with the longitudinal band of the pipe wall along which the succession of drip units 2 is provided. Moreover, the distance between the drip openings 101, so-named drip pitch, in the axial direction of the pipe is corresponding to the distance of the outlet collector elements 202 of the drip units that are arranged in a line so that to form a longitudinal succession of said drip units 2. Thanks to this arrangement, each drip opening 101 of the pipe 1, i.e. each dispensing hole, is coinciding or communicating with the outlet collector element 202 of one of the drip units 2 of the succession of drip units.

A first and a second channel 3 and 30, which act as an inlet collecting channel of the fluid, are respectively provided on both sides of the row or longitudinal succession of drip units 2. Each of these inlet collecting channels 3 is laterally delimited, towards the inner compartment of the pipe, by a side wall 103, 130 and on the opposite side, respectively by the longitudinal side wall 103 of the first most inner collecting channel 3 for the most outer collecting channels 30 and by the side walls 302 delimiting the elements 102 and 202 forming the drip units 2 for the first most inner collecting channel 3 of the most inner wall, i.e. opposite that of the collecting channel 30, i.e. the side adjacent to the succession of drip units. The drip units 2 communicate with the dispensing collecting channels 3 through an inlet opening 402 of the corresponding pressure-reducing element 102.

The pressure-reducing element 102 of the drip units 2 is formed in a known way by a labyrinth element in which the flow paths of the liquid are such as to modify the passing speed thereof and to thus obtain a pressure reduction of the liquid collected in the outlet collector element 202. The pressure is reduced such as to allow a substantially uniform drip for given relatively long lengths of the succession of drip units and thus of the sprinkler pipe when the supply pressure of the fluid in the pipe itself has the typical average values provided in sprinkler systems of this type.

Both the pressure-reducing element 102 with the labyrinth and the outlet collector element 202 of the drip units 2 are however implemented according to the known art and, in particular, according to the patent EP1959724 (B1).

The fluid passes from the inner compartment of the pipe 1 to the inlet collecting channels 3, 30 through the inlet openings of the delimiting longitudinal side wall of the most outer collecting channels 30, with reference to the row of drip holes, and successively from the most outer channels 30 to the corresponding most inner collecting channels 3 directly adjacent and separated from the channels 30 by the longitudinal side wall 103. The flow enters through the inlet opening 402 the labyrinth of the corresponding reducer 102.

The longitudinal side walls 103 and 130 of the first and second collecting channels 3 and 30 have, along their entire extent, passage openings respectively denoted by 203 and 230 and which are alternated to wall segments 303, 330 as better shown in FIG. 1c. Said longitudinal side walls of the first and second channels, i.e. most inner and most outer 3 and 30, which are on their side facing the inside of the pipe, thus respectively form an outer filter 40 and an inner filter 4 for the flow of fluid along both the longitudinal sides of the row of drip units 2, as shown in FIG. 1c.

Each end of the pressure reducer 202, at the inlet 402, is facing the end of the outlet collector 202 of the successive drip unit 2, which is closed by the wall 302 extending without interruptions also at said end of the collector element 202 of the successive drip unit 2. Said end of the pressure reducer 102 of a drip unit and said end adjacent to the outlet collector element 202 of the successive drip unit are spaced in a certain extent, thus forming an opening for the passage of fluid from the two most inner collecting channels 3 towards the inlet 402 of the pressure reducer 102.

In the embodiment of FIGS. 1a to 1c, in the zone between the inlet end of the labyrinth 102 of a preceding drip unit 2 and the initial end of the collector element 202 of the successive drip unit, the opening in the side wall of the two most inner collecting channels 3 is closed respectively by two filtering walls 5, 50 for each passage of the two collecting channels 3 directly adjacent to the drip units 2 and which filtering walls are made similarly to the side walls 103 and 130, a plurality of openings 105, 150 being alternated to a plurality of wall segments 205, 250, as shown in FIG. 1a and more clearly in FIG. 1c.

As is clear in FIG. 1c, the openings 203 and 230 in the side walls of the collecting channels 3 and 30 are aligned with one another in the axial direction of the pipe or of the succession of drip units, while the openings 105, 150 in the couples of filtering walls 5 and 50, adjacent respectively to one of the most inner collecting channels 3, are provided axially staggered with the openings 203 of the side wall 103 of the first most inner adjacent collecting channel 3 and, in particular, are arranged in a quincunx with the latter.

In this case, it is a configuration example that can be made according to further different variants.

For example, in a variant, the openings 203 and 230 can be staggered.

In a further variant, said openings 203 and 230 can be different in size from one another.

This can also be provided in combination for the wall segments or teeth 303 and 330.

Still according to a further variant, the distribution of the openings can be different along the extent of the side walls 103 and 130, thus having zones of greater density and zones of lesser density for said openings 203, 230.

Other possible variants provide a combination of two or more of said alternative variants between one another.

Still a possible variant provides that the thickness of the side walls 103 and 130 is different for said two walls and/or the width of the channels 3 and 30.

Similarly, one or more of the aforesaid variants can also be applied to the filtering walls 5, 50 which can have a distance from the side wall 103 of an adjacent collecting channel 3 different from the width of said collecting channel 103, i.e. greater or lesser, or they can have openings 105, 150 of different width along the extent of the filtering wall 5, 50.

Still, said openings 105, 150 can be distributed with a greater density in one or more zones of said filtering walls 5, 50.

Also the filtering wall segments or teeth 205, 250 can have widths or lengths different from one another and distributed according to predefined patterns along the extent of said filtering walls.

Also in this case, said variants can be provided alternatively or in any combination with one another and identically or differently for the filtering walls of each couple of filtering walls 5, 50 combined with a corresponding most inner collecting channel 3.

Although the exemplary embodiments show a preferred solution with two collecting channels, it is also possible to provide an embodiment in which only the collecting channel 3 is provided on each longitudinal side.

With reference to the second embodiment of FIGS. 2a, 2b and 2c, only one collecting channel 3 for each longitudinal side of the row of drip units is provided in it.

Similarly, in any combination with the aforesaid variants of the number of collecting channels, it is also possible to provide more than two filtering walls parallel to each other or only one filtering wall for each of the collecting channels 3 directly adjacent to the drip units 2.

Correspondingly to that which was previously described, the wall 103 of the collecting channel 3 facing the inside of the pipe is provided with passage openings 203 alternated to teeth or wall segments 303.

Similarly to the preceding embodiment, each filtering wall 5, 50 forming the inner filter has a row of openings 105, 150 alternated to wall segments or teeth 205, 250.

The embodiment shown depicts that the openings 105, 150 and the wall segments of all filtering walls are aligned with one another with reference to the axial position, while they are axially staggered with respect to the openings 203 and to the wall segments 303 of the side walls 103 delimiting the two collecting channels 3 on the side thereof towards the inside of the pipe.

Also for this embodiment, it is possible to provide, alternatively or in combination with one another, one or more of the variants described with reference to the previous exemplary embodiment and which concerns the sizes of the openings 203, 105, 150 and/or of the wall segments 303, 205 and 250, their distribution on the axial length of the walls 103 and of the filtering walls 5, 50, the distance of said filtering walls 5, 50 from the adjacent ones and/or from the wall 103 delimiting the two side collecting channels 3 towards the inside of the pipe.

The FIGS. 3a, 3b, 3c show, with views similar to those of the preceding figures, an embodiment constituted by the combination of the two variants according to FIGS. 1a, 1b, 1c and 2a, 2b, 2c. In this third embodiment, two collecting channels parallel to one another 3 and 30 and two filtering walls 5, 50, at the opening that puts each of the two most inner collecting channels 3 in communication with the inlet 402 of the corresponding labyrinth 202, are thus provided for each longitudinal side of the row of drip units 2.

Both the collecting channels 3, 30 and the filtering walls 5, 50 are made respectively correspondingly to the first embodiment and to the second embodiment. Both the collecting channels 3, 30 and the filtering walls 5, 50 can be made according to one or more of the variants described with reference to the two preceding embodiments, respectively the first and the second embodiment which can be present for the collecting channels 3, 30 and for the filtering walls 5, 50 alternatively with one another or in any combination or sub-combination.

FIGS. 4a to 4d show a fourth embodiment, wherein two collecting channels 3, 30 and two filtering walls 5, 50 are provided for each couple of collecting channels 3, 30 arranged side by side, similarly to the third embodiment. Moreover, communication holes 430 communicating from the inside of the pipe with the collecting channel 30 are provided at the openings 230 in the side wall 130 delimiting the most outer collecting channels 30 in the bottom wall defined by the band of the wall 502 that separates the row of drippers from the inside of the pipe and which is parallel to the band of the pipe wall to which the drippers are coupled.

In the embodiment in which the group of drip units 2 distributed on a row is constituted by a tape comprising a flat wall 502 and a plurality of ribs 302, 303, 330, 205, 250 forming the outlet collector 202, the pressure reducer 102, the walls of the collecting channels 103, 130 and the filtering walls 5, 50, said bottom wall coincides with said flat wall of the tape.

As shown in FIGS. 5a to 5d, in the fifth embodiment of the invention, in which two collecting channels 3, 30 and two filtering walls 5, 50 are provided similarly to the third embodiment for each couple of adjacent collecting channels 3, 30, the holes in the bottom wall 502 are provided coincident with the openings in the longitudinal side wall 103 delimiting the most inner collecting channels 3 and are denoted by 403, said side wall being the one delimiting the most inner collecting channels 3 towards the pipe and towards the adjacent most outer channel 30.

The sixth embodiment shown in FIGS. 6a to 6d instead has the holes in the bottom wall 502 at the openings of the longitudinal side walls 103, 130 delimiting the two collecting channels 3, 30 provided on each side of the row of drip units 2, towards the inside of the pipe 1 and respectively denoted by 403 and 430. In this embodiment, similarly to the preceding FIGS. 3 to 5, two filtering walls 5, 50 are provided for each couple of collecting channels 3, 30.

Also in the event of the holes 430, it is possible to provide different variants wherein the holes 403 or 430 are provided at each opening 203, 230 of the side wall 103, 130 of one or both of the channels or only at some of said openings with similar distributions for the two channels 3, 30 or with different distributions. The density of the distribution of the holes 403, 430 can vary on the length of the channels and identically or differently for each channel 3, 30 and/or the sizes of the holes can be different both between the single channels 403, 430, when two channels are provided, and in the area of the holes 403, 430 of each channel and with reference to the position of the holes with respect, for example, to the inlet 402 of the labyrinth 102 forming the pressure reducers of the drippers, as well as relatively to the size of the side openings 203, 230 in said longitudinal side walls 103, 130 of the channels 3, 30 or wall segments 303, 330 laterally delimiting said openings 303, 330, both with respect to the width of the walls 103, 203 in a direction transverse to the axis of the pipe 1 and in the longitudinal direction of the pipe.

FIGS. 7a to 7c show a seventh embodiment, wherein, along the row of drip units 2, two collecting channels 3, 30, similarly to the embodiment of FIGS. 1a to 1c, are provided for each longitudinal side, while, unlike for this embodiment, no filtering wall is provided between each most inner collecting channel 3 and the openings 402 of the labyrinths of the pressure reducers, and the most inner channels are open for the entire length between the inlet end of said labyrinth 102 and the end of the outlet collector 202 of the adjacent drip unit.

FIGS. 8a to 8c show an eighth embodiment which refers to one of the possible variants for configuring the sizes of the openings 203, 303, 105, 150 in the longitudinal side walls 103, 130 of the collecting channels 3, 30 and in the filtering walls 5, 50. In this case, unlike the embodiment of FIGS. 3a to 3c, the openings 203, 230 in the longitudinal side walls of the collecting channels 3, 30 have an extent in longitudinal direction, denoted by A, of said walls 103, 130 that is greater than the axial extent of the openings 105, 150 provided in the filtering walls 5, 50.

Still according to a further characteristic, said length A is also greater than the width B of the channels 3, 30 and of the distance between the filtering walls 5, 50.

Figure 9B:
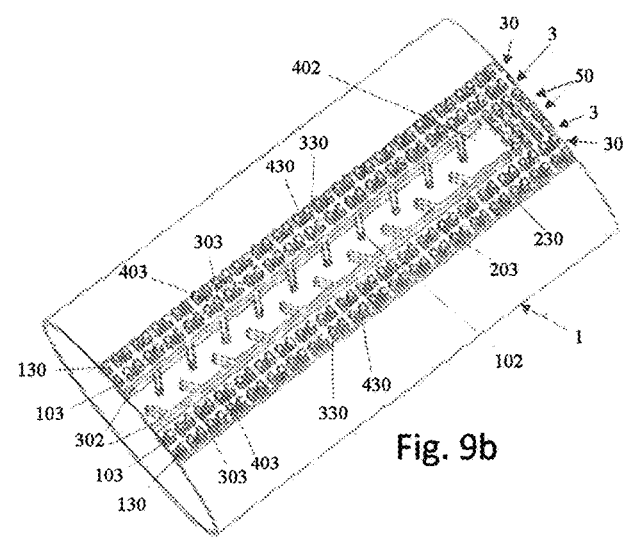
Figure 9C:
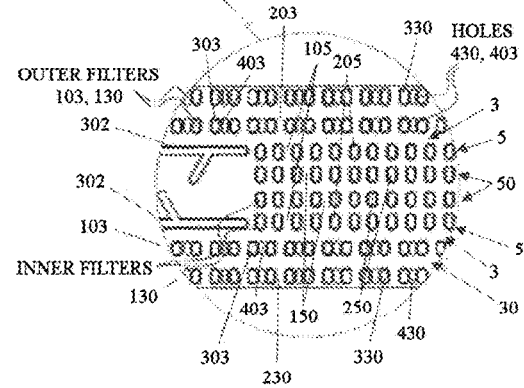

FIGS. 9a to 9c shown a ninth embodiment that is an exemplary variant of the sixth embodiment, wherein the holes 403, 430 in the bottom wall 502 and coinciding with the openings in the longitudinal side walls of the collecting channels 3, 30 are provided only at some of said openings 203, 230, in the longitudinal side walls 103, 130 of the channels 3, 30, and with a distribution which provides an opening 203, 230 for which no hole 403, 430 is provided in the coinciding bottom wall 502 interposed between two openings 203, 230 adjacent thereto, in which bottom wall 502 a hole 403, 430 is instead present. This identically for the longitudinal side walls 103, 130 of all channels and the axial distribution of the holes 403, 430 being identical and aligned to one another for each of the collecting channels 3, 30.

FIGS. 10a to 10c show a further tenth embodiment, whose characteristics can be provided in combination with any of the preceding embodiments and which have greater efficacy in combination with the embodiments that provide holes 403, 430 in the bottom wall 502 that separates the drip units from the inside of the pipe 1 and which is parallel to the band of the wall of the pipe 1 along which the drip units 2 are coupled.

In this case, projections 602 are provided on said bottom wall 502, from the side facing the inside of the pipe and opposite the collecting channels 3, 30 and the labyrinths 102 and outlet collectors 202. The projections 602 can be distributed according to any distribution pattern and are spaced from one another so that to form a grid of surface channels along the side of the wall 502 facing the inside of the pipe 1.

Moreover, when holes 403, 430 are present in the bottom wall 502, the projections are arranged staggered with respect to these holes, thus forming the grid or lattice of channels, at least some of which channels are coincident with said holes 403, 430.

In the example of FIGS. 10a to 10c, the projections 602 are in the form of parallelepiped wedges and are elongated, i.e. with a rectangular planform aligned with the longest side in parallel to the longitudinal extent of the row of drip units and/or to the axis of the pipe 1.

Any embodiment variant can be provided both alternatively or in combination with one another, selected among the following:

projections 602 of different sizes and shapes, different ratios between the sizes of the projections and distances in-between them;

different ratios between the sizes of the projections and sizes of the holes;

uneven distributions of the projections with respect to their position on the extent of the wall 502;

uneven distributions of the projections on the extent of the wall 502 with reference to the sizes of the projections and/or to their distances;

uneven distributions of the projections on the extent of the wall 502 with reference to the position of the holes 403, 430.

With reference to all embodiments shown, a possible variant that emerges, for example with reference to the third and fourth embodiments, is constituted at the distance of the end of the inlet 402 of the labyrinth 102 of a drip unit 2 with respect to the end of the outlet collector 202 of the successive drip unit and thus also to the length of the filtering walls 5, 50 extending for the length defined by said distance. In the third and fourth embodiments, these sizes are different and this can also be with respect to the other embodiments.

Moreover, when the filtering walls 5, 50 are provided, their length is also determined by the shape of the two facing ends, respectively of the inlet of the labyrinth 102 of the preceding drip unit with respect to the one of the outlet collector 202 of the successive drip unit 2, which is made tapered in a triangular shape, i.e. pointed, in the embodiments shown.

With reference to the different embodiments, for any of these, it is possible to provide a variant wherein only one collector 3 is present for each longitudinal side of the row of drip units and/or alternatively or in combination no filtering wall respectively with or without holes in the bottom wall 502.

With reference to the manufacturing of the sprinkler pipe according to the present invention, it can be carried out according to known methods wherein a tape of continuous material is provided with ribs protruding from a side thereof and which are made and distributed according to a predefined pattern or according to a predefined configuration on said tape. Said tape is fixed with the free ends of said ribs protruding therefrom against the inner wall of the pipe 1 so that the connection is liquid-proof. This way, the ribs form the side walls delimiting the collecting channels 3, 30, the filtering walls 5, 50 and the elements 102 and 202 of the drip units, while said channels and said elements are delimited towards the outside of the pipe and towards the inside of the pipe respectively by the longitudinal band of the pipe wall 1 to which the tops of the ribs and of the tape, on which said ribs that form the wall 502 are provided, adhere. Obviously, the adhesion of the tape to the pipe wall by means of the ribs can occur in any way, for example by means of chemical-physical adhesion.

This constructive method is known, however, the tape for making the pipe according to the present invention forms an intermediate element known per se and which comprises a first group of ribs of longitudinal extent which forms a pressure-reducing element 102, wherein the ribs laterally delimit labyrinth-like passages of fluid and a second outlet collector element 202 communicating by an opening with said first element and wherein the ribs peripherally delimit an oblong zone, said configuration of ribs being identically repeated in a row according to the longitudinal axis of said first and second elements, while the configuration of ribs of the pressure-reducing elements is such as to have an opening that opens onto a compartment delimited by a longitudinal side rib provided at a certain distance on at least one of the two sides of the succession of configurations of ribs forming the pressure-reducing elements 102 and outlet collectors 202 of the drip units, which side rib is formed by the rib segments spaced from one another by open zones and at which a configuration of ribs shaped like one or more parallel rows of laterally adjacent wings and spaced from one another and which row or rows extend for the entire spacing zone of two successive longitudinal rib segments, thus forming a filtering element, is provided.

FIGS. 11a to 11c show a further embodiment variant of the present invention. This embodiment variant derives from the fifth embodiment according to FIG. 5, wherein two channels 3, 30 are provided on each longitudinal side of the row of drip units, while the delimiting wall 103 of the most outer channel 30, on each side of the row of drip units, is made in the form of continuous wall, without openings. The fluid is supplied to the collecting channels 3, 30 only by the holes 403 provided in the bottom wall of said channels. In the embodiment of FIGS. 11a to 11c, these holes are provided alternated to the wall segments 303 forming the separating wall between the two adjacent collecting channels 3, 30, similarly to that which is described in the embodiment of FIGS. 5a to 5d.

As far as the further constructive characteristics of the embodiment variant according to FIGS. 11a to 11c are concerned, they are essentially identical to those of the example according to FIGS. 5a to 5d, thus the description of the example according to FIGS. 5a to 5d is also applied in the same way for this embodiment variant.

FIG. 12 is a view similar to that of FIG. 11b and shows a further embodiment of the variant according to FIGS. 11a to 11c. In this case, the difference between the two variants essentially only consists in the different arrangement of the holes 403 in the wall forming the bottom of the collecting channels. In particular, according to this embodiment variant, instead of being provided in the bottom wall and in the zones corresponding to the passage interstices between the row of ribs or the wall segments composing the side wall delimiting the most inner collecting channel (as in the embodiment of FIGS. 11a to 11d), the holes 403 are provided in the bottom wall between the two side walls 103, 130 delimiting the channel 30, respectively most outer and between the most outer delimiting wall 103 of the most inner collecting channel 3, and the wall 302 of the drip units 2 and the filter 5 at the inlet of each drip unit 2.

Thus, the embodiment of FIG. 12 has two rows of holes parallel to one another. Moreover, in the embodiment of FIG. 12, the holes have a distribution such as to be aligned laterally, i.e. in a direction perpendicular to that of the row with the openings present between the rib segments 303 of the wall 103 which constitutes the most outer delimiting wall of the most inner collecting channel 3 and on both sides of said wall 103.

Obviously, also for the embodiment variants of FIGS. 11a to 11c and 12, it is possible to provide all the alternatives already described for the preceding ten embodiments, in particular as far as the distribution of the holes in the bottom wall of the collecting channels is concerned.

As is clear, the row or rows of holes in the bottom wall not only act to allow the fluid to enter the collecting channel, but also have a filtering action which is added to that of the filter already provided in the present description.

The invention claimed is:

1. A conduit comprising:
a plurality of drip units disposed within the conduit, each drip unit being defined upperly by a longitudinal portion of a conduit wall, lowerly by a bottom wall parallel to the longitudinal portion of the conduit wall, and by longitudinal outer side walls connecting the longitudinal portion of the conduit wall to the bottom wall, the conduit having at least one longitudinal row of dispensing holes (101) defined therein and distributed at predefined distances, each of the dispensing holes (101) communicating with one of the drip units (2) provided inside the conduit (1), each of the drip units having an inlet (402) communicating with an inside of the conduit (1) and an outlet (202) communicating with at least one of the dispensing holes (101), wherein:
the inlets (402) of all or some of the drip units (2) respectively communicate with an inner compartment of the drip units via a first collecting channel (3) arranged along an axial direction of the drip units, the drip units being arranged in a row, the first collecting channel (3) extending along an entire extent or along part of a longitudinal extent of said row of drip units (2), the first collecting channel (3) is delimited, on each side facing an inside of the row of drip units, by the bottom wall (502), along a band defined by the row of drip units (2), and by a longitudinal inner side wall (103) that is filter-shaped by being provided with openings (203) of a predefined size that are alternated with closed wall sections or wall segments (303), on at least one side of the row of drip units (2), a second collecting channel (30) is provided that extends along said first collecting channel (3), the second collecting channel (30) has a longitudinal side wall that is filter-shaped by being provided with openings (230) of predefined size alternated with closed wall sections or wall segments (330), and a communication hole (403, 430) is provided in the bottom wall (502) of each drip unit in correspondence of one or both of the openings in the longitudinal outer side walls (103) of the first collecting channel or the longitudinal side wall of the second collecting channel (30).

2. The conduit according to claim 1, wherein the openings (3, 30), in the longitudinal side walls (103, 130) of the first and the second collecting channels (3, 30) on the side thereof facing an inside of the drip units, are alternatively selected between only one or a combination of alternatives consisting in:

openings (203, 230) in the longitudinal side walls (103, 130) of all or part of the first and the second collecting channels (3, 30) having positions aligned between one another or coinciding in the axial direction of the drip unit, openings (203, 230) in the longitudinal side walls (103, 130) of all or part of the first and the second collecting channels (3, 30) having a position between one another not coinciding with reference to the axial direction and a different or equal number of openings (203, 230) in the longitudinal side walls (103, 130) for at least part of the first and the second collecting channels (3, 30), openings in the longitudinal side walls (103, 130) of part or all of the first and the second collecting channels (3, 30) having an uneven distribution along the longitudinal extent of said longitudinal walls and zones of greater density and zones of lesser density depending on a relative position with respect to the inlet (402) of the drip unit (2), or openings (203, 230) in the longitudinal side walls (103, 130) of all or of part of the first and the second collecting channels (3, 30), which have a different size of port depending on their position with reference to the inlets (402) of the drip units (2).

3. The conduit according to claim 2, wherein said communication holes (403, 430) are provided in the bottom wall (502) coinciding with the longitudinal inner and outer side walls (103, 130) delimiting the first collecting channel or the second collecting channels (3, 30) towards the inside of the drip unit and coincide with some or all of the openings (203, 230) provided in in the longitudinal outer side walls (103) of the first collecting channel or the longitudinal side wall of the second collecting channel (30).

4. The conduit according to claim 1, wherein the holes (403, 430) in the bottom wall (502) are configured according to different variants that are selected between one or more of the following alternatives or combinations thereof:
- holes (403, 430) in the bottom wall (502) of part or all the first and the second collecting channels (3, 30), holes (403, 430) in the bottom wall of the first collecting channel or the second collecting channel (3, 30) having different or identical passage ports,
- holes (403, 430) in the bottom wall (502) of all or part of the first collecting channel or the second collecting channel (3, 30), only provided in some zones of said first collecting channel or the second collecting channel (3, 30) or with an uneven distribution along the extent of the first collecting channel or the second collecting channel (3, 30),
- holes (403, 430) for all or part of the first collecting channel or the second collecting channel (3, 30) distributed therealong so as to achieve a greater density in zones of the inlets (402) of the drip units (2), or
- a distribution of holes (403, 430) in the first collecting channel or the second collecting channels channel (3, 30) or in part thereof, according to which said holes of the distribution of holes (403, 430) in the bottom wall (502) are provided at all or only with some of the openings (203, 230) of the longitudinal inner and outer side walls (103, 130) of the first collecting channel or the second collecting channel (3, 30) facing an inside of the drip unit.

5. The conduit according to claim 1, further comprising one or more additional longitudinal filtering walls (5, 50) arranged longitudinally between adjacent drip units, each additional filtering wall being provided with a row of openings (105, 150).

6. The conduit according to claim 5, wherein said one or more additional filtering walls (5, 50) are provided longitudinally aligned with the longitudinal side walls of an outlet collector (202) and/or of a pressure reducer labyrinth (102) of respectively two adjacent drip units (2).

7. The conduit according to claim 5, wherein the one or more additional filtering walls consist of two or more additional filtering walls (5, 50), parallel to one another and at a predefined distance side by side from one another.

8. The conduit according to claim 5, wherein, in alternative or combination, one or more of the following configurations are provided:
- openings (105, 150) in all or in part of the additional filtering walls (5, 50) and/or holes of identical or different size in the bottom wall (502),
- openings (105, 150) in all or in part of the additional filtering walls (5, 50), which are provided coincident to one another in a transverse direction of the row of drip units (2),
- openings (105, 150) in all or in part of the additional filtering walls (5, 50), which are distributed unevenly or which are of non-identical size from one another depending on the distance from the inlet (402) to a corresponding drip unit (2), or
- a number of openings (105, 150) in at least part of the additional filtering walls (5, 50), which is different for each filtering wall (5, 50) of said at least part of the filtering walls.

9. The conduit according to claim 1, wherein, on the bottom wall (502), one or more rows of projections (602) spaced from one another are provided.

10. The conduit according to claim 9, wherein said projections (602) are arranged on several longitudinal rows parallel to one another and/or on several transverse rows parallel to one another, said projections forming a grid of channels interposed between individual projections.

11. The conduit according to claim 9, wherein said projections are as follows:
- configured with a same or different size in height and/or in plan view,
- configured with the same shape in plan view and/or in a cross section and/or in an axial section,
- arranged with an even distribution along an axial and/or transverse direction with respect to the axial direction; or
- arranged to be in a position not coinciding with the communication holes provided in said bottom wall (502), thus forming a filtering grid or knurl operating in combination with said communication holes in the bottom wall.

12. The conduit according to claim 1, further comprising an additional row of holes in one or more of the following positions:
- in a first position in the bottom wall and in free zones between the longitudinal inner side walls; or
- in a second position in the bottom wall in a laterally staggered position with respect to longitudinal inner side walls.

* * * * *